US009575816B2

(12) United States Patent
Hooker et al.

(10) Patent No.: US 9,575,816 B2
(45) Date of Patent: Feb. 21, 2017

(54) DEADLOCK/LIVELOCK RESOLUTION USING SERVICE PROCESSOR

(71) Applicant: VIA Technologies, Inc., New Taipei (TW)

(72) Inventors: Rodney E. Hooker, Austin, TX (US); Douglas R. Reed, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 232 days.

(21) Appl. No.: 13/758,924

(22) Filed: Feb. 4, 2013

(65) Prior Publication Data
US 2013/0318530 A1 Nov. 28, 2013

Related U.S. Application Data

(60) Provisional application No. 61/617,406, filed on Mar. 29, 2012, provisional application No. 61/755,685, filed on Jan. 23, 2013.

(51) Int. Cl.
*G06F 9/52* (2006.01)
*G06F 9/38* (2006.01)
*G06F 11/07* (2006.01)

(52) U.S. Cl.
CPC .............. *G06F 9/526* (2013.01); *G06F 9/38* (2013.01); *G06F 9/3836* (2013.01); *G06F 11/0721* (2013.01); *G06F 11/0751* (2013.01); *G06F 11/0793* (2013.01)

(58) Field of Classification Search
None
See application file for complete search history.

(56) References Cited

U.S. PATENT DOCUMENTS

| 5,940,826 A * | 8/1999 | Heideman et al. | |
| 6,526,485 B1 * | 2/2003 | Moudgal et al. | 711/159 |
| 6,553,512 B1 | 4/2003 | Gibson | |
| 6,745,321 B1 * | 6/2004 | Floyd et al. | 712/227 |

(Continued)

OTHER PUBLICATIONS

Fong Pong, "Verification Techniques for Cache Coherence Protocols", 1997, ACM Computing Surveys.*

(Continued)

*Primary Examiner* — Lewis A Bullock, Jr.
*Assistant Examiner* — Wynuel Aquino
(74) *Attorney, Agent, or Firm* — E. Alan Davis; James W. Huffman

(57) ABSTRACT

A microprocessor includes a main processor and a service processor. The service processor is configured to detect and break a deadlock/livelock condition in the main processor. The service processor detects the deadlock/livelock condition by detecting the main processor has not retired an instruction or completed a processor bus transaction for a predetermined number of clock cycles. In response to detecting the deadlock/livelock condition in the main processor, the service processor causes arbitration requests to a cache memory to be captured in a buffer, analyzes the captured requests to detect a pattern that may indicate a bug causing the condition and performs actions associated with the pattern to break the deadlock/livelock. The actions include suppression of arbitration requests to the cache, suppression of comparisons cache request addresses and killing requests to access the cache.

18 Claims, 3 Drawing Sheets

(56) References Cited

U.S. PATENT DOCUMENTS

| | | | |
|---|---|---|---|
| 7,500,035 B2* | 3/2009 | Johns et al. | 710/113 |
| 2004/0225731 A1* | 11/2004 | Piispanen et al. | 709/224 |
| 2006/0184770 A1* | 8/2006 | Bishop et al. | 712/216 |
| 2006/0242517 A1 | 10/2006 | Pedley et al. | |
| 2007/0088939 A1* | 4/2007 | Baumberger | G06F 9/24 |
| | | | 712/248 |
| 2008/0059723 A1* | 3/2008 | Math et al. | G06F 13/161 |
| | | | 711/154 |
| 2008/0071955 A1 | 3/2008 | Johns et al. | |
| 2008/0301374 A1 | 12/2008 | Hall et al. | |
| 2008/0320231 A1* | 12/2008 | Kinter et al. | G06F 12/0833 |
| | | | 711/141 |
| 2009/0063780 A1* | 3/2009 | Terechko et al. | 711/141 |
| 2009/0198969 A1* | 8/2009 | Nystad et al. | 712/216 |
| 2010/0125707 A1* | 5/2010 | Cypher et al. | 711/145 |

OTHER PUBLICATIONS

Sys-con, "Multi-Core Debugging and Performance Enhancement", 2008, Sys-con media (http://douglaseadline.sys-con.com/node/355771/mobile).*

Ilya Wagner, "CASPAR: Hardware Patching for Multi-core Processors", 2009, University of Michigan, Ann Arbor, MI.*

Gwennap, Linley. "P6 Microcode Can Be Patched: Intel Discloses Details of Download Mechanism for Fixing CPU Bugs." Microdesign Resources, Sep. 15, 1997, Microprocessor Report. pp. 1-2.

* cited by examiner

DEADLOCK/LIVELOCK RESOLUTION USING SERVICE PROCESSOR

CROSS REFERENCE TO RELATED APPLICATION(S)

This application claims priority based on the following U.S. Provisional Applications, each of which is hereby incorporated by reference in its entirety.

| Ser. No. | Filing Date | Title |
| --- | --- | --- |
| 61/617,406 | Mar. 29, 2012 | DEADLOCK/LIVELOCK RESOLUTION USING SERVICE PROCESSOR |
| 61/755,685 | Jan. 23, 2013 | DEADLOCK/LIVELOCK RESOLUTION USING SERVICE PROCESSOR |

BACKGROUND

The present inventor has observed that there are classes of bugs in microprocessor designs in which the microprocessor gets hung (i.e., it is no longer retiring instructions) because a deadlock or livelock condition has occurred at one of the cache memories of the microprocessor. For example, a bug may cause the processor to be unable to answer an external snoop of its caches and consequently "snoop stall" indefinitely, which has the effect of blocking the bus from performing any further bus cycles (i.e., a "bus hang"). For another example, a bug may cause the processor to be unable to drive data in response to a snoop and "DBSY stall" indefinitely, which also causes a bus hang. Such bugs may obviously have detrimental effects in a computing system that includes the microprocessor. Furthermore, such bugs may be difficult to debug if the microprocessor stays in the deadlock/livelock condition. What is needed is a way to break the deadlock/livelock situation.

BRIEF SUMMARY

In one aspect the present invention provides a microprocessor. The microprocessor includes a main processor and a service processor. The service processor is configured to detect and break a deadlock/livelock condition in the main processor.

In another aspect, the present invention provides a method. The method includes executing, by a main processor of a microprocessor, instructions. The method also includes detecting, by a service processor of the microprocessor, a deadlock/livelock condition in the main processor. The method also includes breaking, by the service processor, the deadlock/livelock condition in the main processor.

In yet another aspect, the present invention provides a computer program product encoded in at least one non-transitory computer usable medium for use with a computing device, the computer program product comprising computer usable program code embodied in said medium for specifying a microprocessor. The computer usable program code includes first program code for specifying a main processor and second program code for specifying a service processor, configured to detect and break a deadlock/livelock condition in the main processor.

Preferably, the service processor detects the deadlock/livelock condition by detecting the main processor has not retired an instruction or completed a processor bus transaction for a predetermined number of clock cycles, which may be programmable. In response to detecting the deadlock/livelock condition in the main processor, the service processor may cause arbitration requests to a cache memory to be captured in a buffer, analyzes the captured requests to detect a pattern that may indicate a bug causing the condition and performs actions associated with the pattern to break the deadlock/livelock. The actions may include suppression of arbitration requests to the cache, suppression of comparisons cache request addresses and killing requests to access the cache.

DETAILED DESCRIPTION OF THE EMBODIMENTS

A processor is described that includes not only its main processor (e.g., an x86 architecture processor), but also a service processor (SPROC) capable of detecting and breaking a deadlock/livelock condition in the main processor. When the SPROC detects the main processor is no longer retiring instructions, it causes arbitration requests to the cache memories to be captured in a buffer, analyzes the buffer contents to detect patterns of known classes of bugs, and controls the offending cache memory according to a recipe of actions associated with the bug class to allow the cache to break its deadlock/livelock condition such that the bus cycle can be terminated and the bus hang condition alleviated. Allowing the bus to continue posting cycles after the deadlock/livelock condition is broken may allow the designers to use various tools to reproduce the failure in simulation, which may be a significant aid in debugging the design. In one embodiment, the SPROC executes microcode, and the microcode is patchable, such as through BIOS. Specifically, the SPROC microcode patch may include a new bug class detection pattern and/or new associated recipe.

Terminating the bus cycle by having the SPROC control the cache memory according to the associated recipe may or may not result in data corruption. If the recipe actions have the effect of corrupting data, then for the particular bug class the technique is only useful for debugging. However, if the termination does not corrupt data and still allows the deadlock or livelock to be broken, the technique may also be employed as a silicon fix for the bug.

Figure 1:
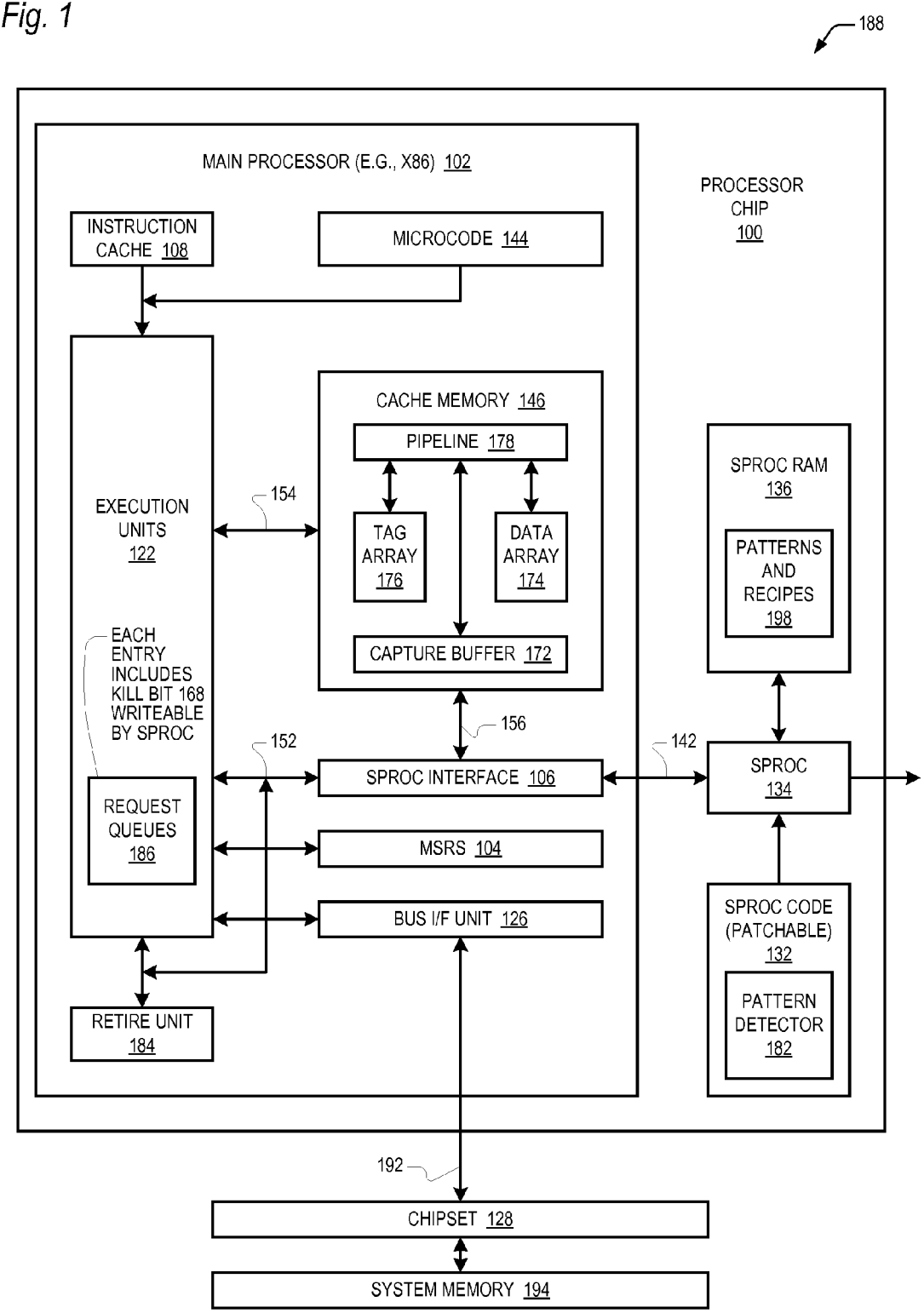
FIG. 1 is a block diagram illustrating a system including a processor chip having a main processor and a service processor (SPROC).

Referring now to FIG. 1, a block diagram illustrating a system 188 including a processor chip 100 having a main processor 102 and a service processor (SPROC) 134 according to the present invention is shown. The microprocessor 100 includes a service processor (SPROC) 134 in addition to the main processor 102. The term "main processor" or "processor" or "microprocessor" used herein refers to the non-service processor 134 portion of the integrated circuit 100. In one embodiment, the main processor 102 is an x86 (also referred to as IA-32) architecture processor 102; however, other processor architectures may be employed. A processor is an x86 architecture processor if it can correctly execute a majority of the application programs that are designed to be executed on an x86 processor. An application program is correctly executed if its expected results are obtained. In particular, the main processor 102 executes instructions of the x86 instruction set and includes the x86 user-visible register set.

The SPROC 134 communicates with portions of the main processor 102 via an SPROC interface 106 of the main processor 102. The SPROC interface 106 includes control and status registers that may be written and read by the SPROC 134 and by portions of the main processor 102 to facilitate communication between them. More specifically, the SPROC 134 can communicate and control actions of a cache memory 146 of the main processor 102 as described in detail herein in order to resolve deadlock/livelock conditions. Additionally, the SPROC 134 can communicate with a retire unit 184 and bus interface unit 126 of the main processor 102 to determine whether the main processor 102 is hung. Finally, the SPROC 134 can communicate with request queues 186 of the main processor 102 to specify that requests therein are to be killed, as described in more detail below.

The main processor 102 includes an instruction cache 108 and a microcode unit 144, each of which provides instructions to execution units 122. The main processor 102 may also include other functional units such as, but not limited to, an instruction translator, a register alias table, and reservation stations.

The main processor 102 also includes a cache memory 146. The cache memory 146 includes a data array 174 for storing cache lines of data and/or instructions cached from the system memory 194. The cache memory 146 also includes a tag array 176 that stores address tags of the corresponding cache lines in the data array 174. The tag array 176 also stores status information of the cache lines, including cache coherency information, such as MESI state. The cache memory 146 also includes a capture buffer 172 that stores information about requests 154 made to the cache memory 146. FIG. 3 describes in detail an entry 300 in the capture buffer 172. Advantageously, the request 154 information stored in the capture buffer 172 may be analyzed by the SPROC 134 to detect classes of deadlock/livelock bugs, as described herein. In one embodiment, the capture buffer 172 comprises a non-user-accessible portion of the cache data array 174. The cache memory 146 also includes a pipeline 178 coupled to the data array 174, tag array 176, and capture buffer 172 that reads and writes the data array 174 and tag array 176 in response to requests 154 received from other functional units of the main processor 102, and in particular, from request queues 186 of the main processor 102. The requests 154 generated by the request queues 186 arbitrate with one another for access to the cache memory 146. The pipeline 178 also writes and reads the capture buffer 172 in response to commands from the SPROC 134. In particular, the pipeline 178 includes the ability to selectively suppress arbitration requests 154 to the cache memory 146, to selectively suppress address comparison results, and to kill requests 154 to the cache memory 146, i.e., to complete a request 154 without performing its intended function. The pipeline 178 is described in more detail with respect to FIG. 2. The main processor 102 may include a hierarchy of cache memories; preferably, the cache memory 146 that includes the ability to perform actions that may potentially resolve a deadlock/livelock condition is a relatively large cache memory within the cache hierarchy, such as an level-2 or level-3 cache, such that the additional deadlock/livelock breaking circuitry constitutes a relatively small percentage of the total cache size and power consumption. However, more than one or all of the cache memories in the hierarchy may include the deadlock/livelock breaking capability.

The execution units 122 execute the instructions received from the instruction cache 108 and microcode unit 144 and/or translated microinstructions thereof. The execution units 122 may include integer units, floating-point units, load units, store units, branch units, and so forth. The execution units 122 are coupled to the cache memory 146, described in more detail below. The execution units 122 include request queues 186, such as, but not limited to, a load queue and a store queue, for example, that make arbitration requests 154 to access the cache memory 146 to load or store data. Additionally, request queues 186 may exist within the bus interface unit 126 and the cache memory 146 itself, such as a snoop queue, a replay queue, or an eviction queue, for example, that make requests 154 to access the cache memory 146. The request queues 186 include entries that specify the intended function of the arbitration requests 154 to the cache memory 146, such as reading, writing, or querying the cache memory 146. Advantageously, each entry in the request queues 186 includes a kill bit 168 that is settable by the SPROC 134 to enable the SPROC 134 to request the cache memory 146 to kill the arbitration request 154 when it is granted access to the cache memory 146, as described in more detail below.

The main processor 102 also includes a retire unit 184, coupled to the execution units 122, that retires completed instructions. The retire unit 184 provides an indicator that indicates when an instruction has retired (preferably how many instructions have retired each clock cycle). Advantageously, the retire indicator is provided to the SPROC 134 via the SPROC interface 106 to enable the SPROC 134 to determine that the main processor 102 is not retiring instructions, i.e., is hung, possibly due to a deadlock/livelock condition.

The main processor 102 also includes a bus interface unit 126 that interfaces the main processor 102 to a processor bus 192 that couples the main processor 102 to a chipset 128, which is coupled to system memory 194.

The SPROC 134 has its own code 132 that it executes and its own RAM 136 for storing bug class patterns and action recipes 198 (described in more detail below). Advantageously, a user may program model specific registers (MSR) 104 of the main processor 102 to patch the SPROC code 132 (and the microcode 144). In one embodiment, the SPROC code 132 may be patched using the SPROC RAM 136 as follows. A write to the main processor 102 MSR 104 (e.g., by system firmware, such as BIOS, or system software) causes the main processor 102 microcode 144 to be invoked and detect that a patch is to be applied. The patch information includes patch code and an SPROC 134 instruction pointer value at which it is desired for the SPROC 134 to execute the patch code rather than the SPROC code 132 at the instruction pointer value. The microcode 144 writes the patch code to an unused location in the SPROC RAM 136. The microcode 144 then sets an SPROC 134 instruction breakpoint entry to cause the SPROC 134 to jump to the location in the SPROC RAM 136 at which the patch code resides when the SPROC 134 instruction pointer value reaches the value specified in the patch information.

Because the SPROC 134 is running code 132 independently of the main processor 102, it can detect when the main processor 102 is hung, such as may be caused by a deadlock/livelock condition, and autonomously attempt to resolve the deadlock/livelock. The patchable SPROC code 132 includes a pattern detector 182 that is configured to detect patterns 198 in the arbitration requests 154 made to the cache memory 146 captured to the capture buffer 172 that may be associated with known deadlock/livelock bug classes and to perform actions specified by recipes 198 associated with the deadlock/livelock bug classes in order to resolve deadlock/livelock conditions to aid in debugging the main processor 102 and/or to fix the bug, as described herein. According to one embodiment, the set of actions that may be included in a recipe 198 include, but is not limited to: (1) suppressing individual arbitration requests 154 from attempting to arbitrate for access to the cache memory 146; (2) suppressing individual address comparison results associated with arbitration requests 154; and (3) marking individual requests in the request queues 186 to be killed by setting their associated kill bit 168.

Figure 2:
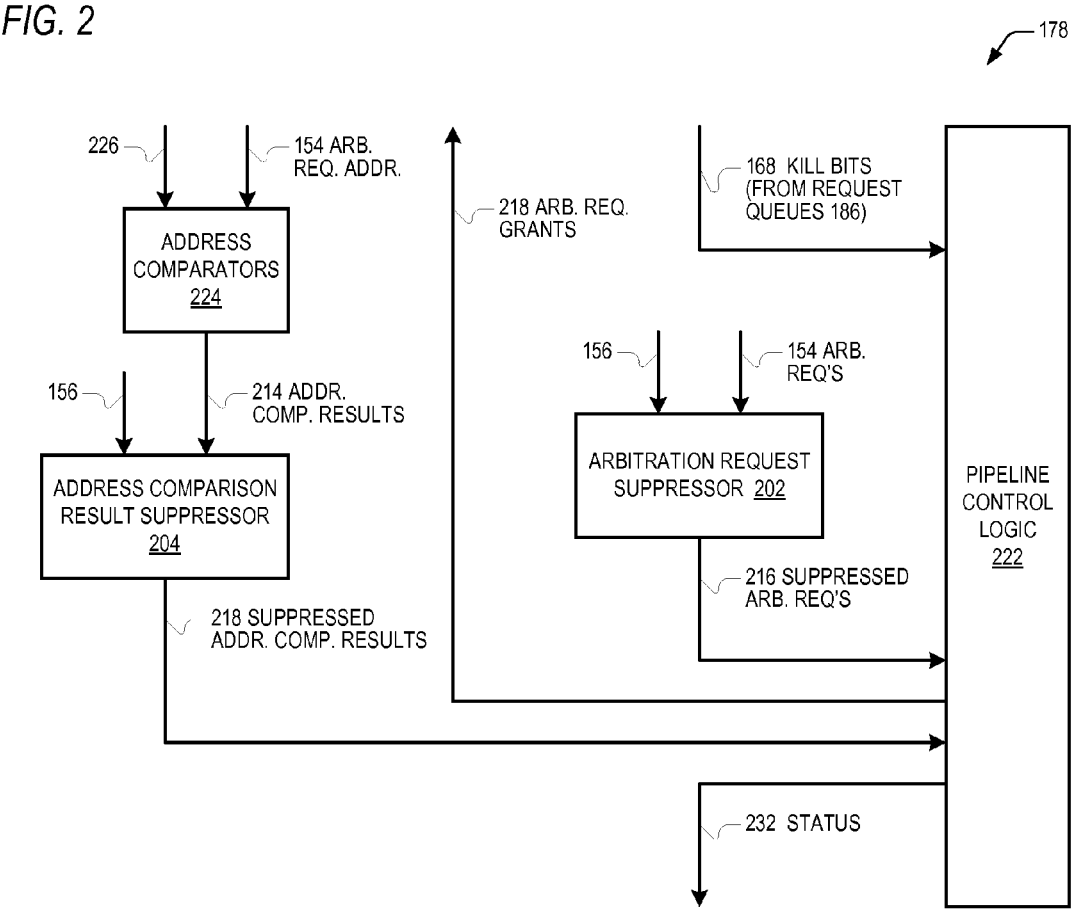
FIG. 2 is a block diagram illustrating in more detail the cache memory pipeline of FIG. 1.
Figure 3:
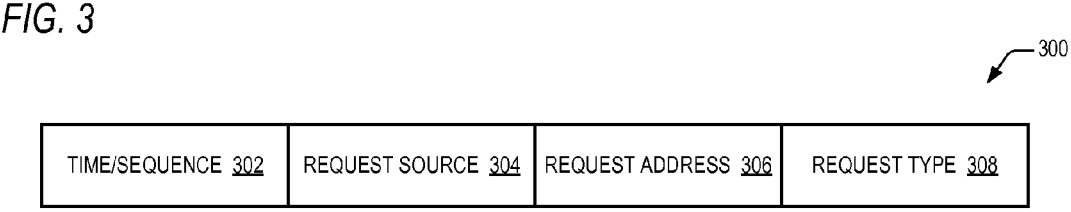
FIG. 3 is a block diagram illustrating an entry in the capture buffer of FIG. 1.

Referring now to FIG. 2, a block diagram illustrating in more detail the cache memory 146 pipeline 178 of FIG. 1 according to the present invention is shown. The pipeline 178 includes pipeline control logic 222 that processes arbitration requests 154 as they enter the pipeline 178 and proceed down it. In particular, the pipeline control logic 222 controls access to the data array 174, tag array 176, and capture buffer 172; additionally, the pipeline control logic 222 generates a status 232 of each arbitration request 154 that is provided back to the requestor.

The pipeline 178 includes an arbitration request suppressor 202 that receives the arbitration requests 154 from the execution units 122 and responsively generates suppressed arbitration requests 216 that are provided to the pipeline control logic 222. Advantageously, the SPROC 134 may program a register within the arbitration request suppressor 202 via the SPROC interface 106 to specify individual arbitration request inputs 154 that are to be suppressed according to the recipe 198 associated with a detected pattern 198 associated with a known class of deadlock/livelock bug, as described herein. That is, the SPROC 134 may selectively and temporarily effectively prevent a particular requestor (e.g., a particular request queue 186) from requesting access to the cache memory 146. This may be helpful in changing the mix or order of requests 154 to the cache memory 146 in such a way that may perturb a livelock sequence to resolve it. If the SPROC 134 detects that the selective arbitration request 154 suppression resolved the livelock, the SPROC 134 may then re-enable the previously suppressed requestor to request access to the cache memory 146 and operation of the microprocessor 100 may proceed in a functionally correct manner. In one embodiment, the arbitration request suppressor 202 comprises a plurality of two-input AND gates each of which receives on one input one of the arbitration requests 154 and on the other input a corresponding bit from the register to which the SPROC 134 writes a value that has a false bit value for each arbitration request 154 to be suppressed. In response to the suppressed arbitration requests 216, the pipeline control logic 222 generates arbitration request grant signals 218 back to the requesting entities to indicate which requestor 154 has been granted access to the cache memory 146 for a given clock cycle. Advantageously, a suppressed request 154 will not be granted access to the cache memory 146, which may aid in breaking the deadlock/livelock condition, either on its own or in combination with one or more of the other possible actions described herein.

The pipeline 178 also includes address comparators 224 coupled to an address comparison result suppressor 204. The address comparators 224 compare the memory address specified by the arbitration request 154 that was granted access to the cache memory 146 with memory addresses 226 of other older memory operations in the main processor 102 pipeline to generate address comparison results 214 that are provided to the address comparison result suppressor 204. The address comparisons may include full address comparisons and may include comparisons of only a subset of the full memory address. The address comparison results 214 may also include results of comparisons of the arbitration request address 154 with tags in the tag array 176. The address comparison result suppressor 204 receives the address comparison results 214 and responsively generates suppressed address comparison results 218 that are provided to the pipeline control logic 222. That is, a particular suppressed address comparison result 218 may indicate a false value (i.e., an address mismatch) even though its corresponding address comparison result 214 had a true value (i.e., an address match) if the SPROC 134 programmed the address comparison result suppressor 204 to do so. That is, the SPROC 134 causes the cache memory 146 to metaphorically "lie" about the results of selected address comparisons. For example, the pattern detector 182 may detect a pattern within the capture buffer 172 in which a particular arbitration request 154 cannot proceed because its address matches another request 154 ahead of it in some manner such that the particular request 154 cannot continue or complete. Typically, suppressing an address comparison result 214 will cause a functional error such that this particular deadlock/livelock resolution action may not typically be used to fix bugs; nevertheless, it may be used to find bugs. The SPROC 134 may program a register within the address comparison result suppressor 204 via the SPROC interface 106 to specify individual address comparison results 214 that are to be suppressed according to the recipe 198 associated with a detected pattern 198 associated with a known class of deadlock/livelock bug, as described herein. In one embodiment, the address comparison result suppressor 204 comprises a plurality of two-input AND gates each of which receives on one input one of the address comparison results 214 and on the other input a corresponding bit from the register to which the SPROC 134 writes a value that has a false bit value for each address comparison result 214 to be suppressed. In response to, along with other inputs, the suppressed address comparison results 218, the pipeline control logic 222 decides upon what action to take and generates the status 232 of the request 154 back to the requesting entity. If one or more of the results 218 indicate an address comparison mismatch because it was suppressed, the status 232 may have a different value than it would if the address comparison result 214 had not been suppressed, i.e., if the address comparison would have otherwise indicated a match. Additionally, the pipeline control logic 222 itself may perform a different action based on the indicated address comparison mismatch than it would have if the address comparison result 214 had not been suppressed. Advantageously, a modified status 232 received by the requesting entity and/or modified action by the pipeline control logic 222 may aid in breaking the deadlock/livelock condition, either on its own or in combination with one or more of the other possible actions described herein. There may be classes of bugs whose livelock conditions may not be resolvable via the selective arbitration request 154 suppression action described above. For example, the cache memory 146 may have been designed to create a circular dependency between two or more coexisting queue entries such that suppressing arbitration requests 154 will not resolve the livelock. In such a situation, temporarily suppressing address comparison results may resolve the livelock, and may also resolve deadlock conditions.

Additionally, the pipeline control logic 222 receives the kill bits 168 from the request queues 186 of FIG. 1 and responsively kills any arbitration request 154 that has its kill bit 168 set. Advantageously, the SPROC 134 may set a kill bit 168 in a request queue 186 entry according to the recipe 198 associated with a detected pattern 198 associated with a known class of deadlock/livelock bug, as described herein, so that the pipeline control logic 222 kills the associated arbitration request 154. When the pipeline control logic 222 kills an arbitration request 154, it completes the request 154 without carrying out the intended function of the request 154. For example, assuming the intended function of the request 154 to be killed is to update the tag array 176 and data array 174 because the request 154 is an allocation of some sort, the pipeline control logic 222 completes the request 154 without updating the tag array 176 and data array 174. The pipeline control logic 222 refrains from carrying out the intended function of the request 154 and yet indicates on its status 232 that the request 154 completed so that the request 1546 does not continue to attempt to arbitrate for access to the cache memory 146. If an arbitration request 154 is killed, its status 232 may have a different value than it would if it had not been killed. Typically, killing a request 154 will cause a functional error such that this particular deadlock/livelock resolution action may not typically be used to fix bugs; nevertheless, it may be used to find bugs. Advantageously, killing a request 154 may aid in breaking the deadlock/livelock condition, either on its own or in combination with one or more of the other possible actions described herein.

Referring now to FIG. 3, a block diagram illustrating an entry 300 in the capture buffer 172 of FIG. 1 according to the present invention is shown. Each entry 300 includes a time/sequence field 302, a request source field 304, a request address field 306, and a request type field 308 associated with the arbitration request 154 that was captured in the entry 300.

The time/sequence field 302 indicates temporally when the arbitration request 154 occurred relative to the other arbitration requests 154 associated with the other entries 300 in the capture buffer 172, which may be indicated by an absolute time, an absolute clock cycle number since the processor 100 was reset, or a serial or sequence number associated with the entry 300, for example.

The request source field 304 indicates the source of the arbitration request 154, such as, but not limited to, a load queue, a store queue, the bus interface unit 126, a replay queue within the cache memory 146, an eviction queue, or a snoop queue, for example.

The request address field 306 indicates the memory address specified by the arbitration request 154.

The request type field 308 indicates the type of action performed by the arbitration request 154, such as, but not limited to, a load, a store, a cache line eviction, a snoop, a snoop query, a store finish, a cache line eviction finish, a load finish, or a snoop query, for example. Furthermore, each type may further specify which cache in the hierarchy requested the action.

Figure 4:
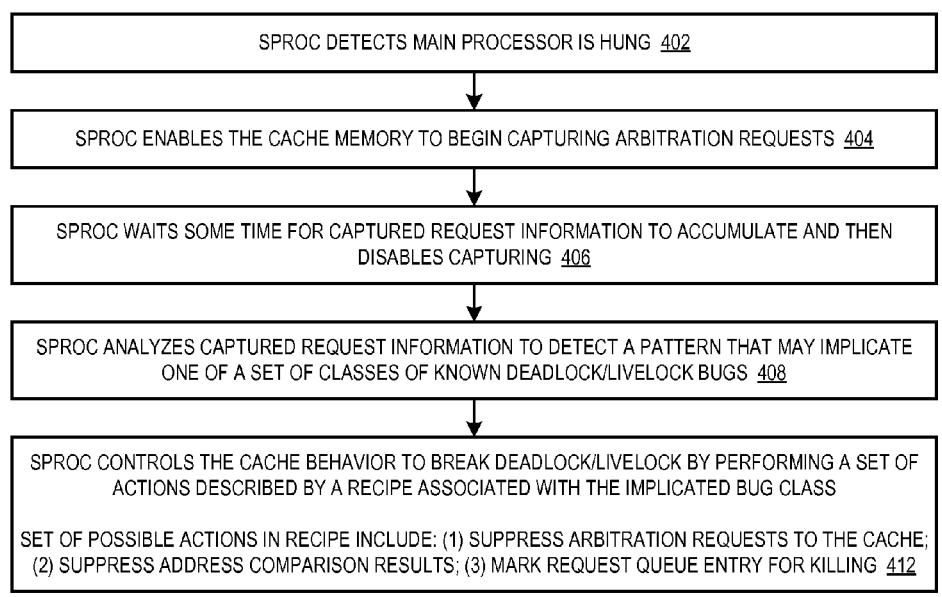
FIG. 4 is a flowchart illustrating operation of the processor of FIG. 1.

Referring now to FIG. 4, a flowchart illustrating operation of the processor of FIG. 1 according to the present invention is shown. Flow begins at block 402.

At block 402, the SPROC 134 detects the main processor 102 is hung. In one embodiment, the SPROC 134 detects that the main processor 102 is hung because the retire unit 184 has not retired any instructions for a predetermined number of clock cycles and/or that the bus interface unit 126 indicates that no transactions on the processor bus 192 have completed for a predetermined number of clock cycles. The two predetermined numbers of clock cycles may be programmable, e.g., by BIOS, the operating system or other software, e.g., via the MSR-based patch mechanism described above, or directly to the SPROC 134 via an external bus to which the SPROC 134 is coupled, or by blowing fuses of the microprocessor 100 dedicated for such purpose. Flow proceeds to block 404.

At block 404, the SPROC 134 enables the cache memory 146 to begin capturing arbitration request 154 information to the entries 300 of the capture buffer 172 in response to the hang condition detected at block 402. In response, the cache memory 146 begins capturing arbitration requests 154 to the capture buffer 172. Flow proceeds to block 406.

At block 406, the SPROC 134 waits a predetermined amount of time (e.g., a predetermined number of clock cycles) for the information specifying the captured arbitration requests 154 to accumulate in the capture buffer 172 and then disables the cache memory 146 from capturing the arbitration requests 154 to the capture buffer 172. Alternatively, the SPROC 134 disables the cache memory 146 from capturing the arbitration requests 154 to the capture buffer 172 after a predetermined number of arbitration requests 154 have been captured or when the capture buffer 172 becomes full. Flow proceeds to block 408.

At block 408, the SPROC 134 pattern detector 182 analyzes the arbitration request 154 information captured in the capture buffer 172 at block 406 to detect a pattern in the pattern information 198 that may implicate a known class of deadlock/livelock bugs associated with the pattern from among the set of classes of known bugs associated with the patterns 198. That is, the pattern detector 182 identifies a potential bug class that may exhibit a deadlock/livelock condition. For example, the microprocessor 100 designers may have previously identified a bug in which an external snoop is preceded by an eviction from a level-1 data cache of the same cache line referenced by the snoop. For another example, the snoop may be to a different cache line in the same set in the cache memory 146 as the evicted cache line. Flow proceeds to block 412.

At block 412, the SPROC 134 controls the cache memory 146 behavior to break the deadlock/livelock detected at block 402 by performing a set of actions described by the recipe 198 associated with the class of bug detected at block 408. As described above, one set of possible actions to break the deadlock/livelock may include, but is not limited to: (1) suppressing individual arbitration requests 154 by programming the arbitration request suppressor 202; (2) suppressing individual address comparison results 214 by programming the address comparison result suppressor 204; and (3) marking individual requests in the request queues 186 to be killed by setting their associated kill bit 168. Flow ends at block 412.

Although embodiments have been described in which the main processor has a single processing core, other embodiments are contemplated in which the main processor has multiple processing cores, i.e., a multi-core processor. In such an embodiment, the processor chip may include a SPROC associated with each main processing core, or a single SPROC may monitor and control all the processing cores. Additionally, although embodiments are described in which the SPROC detects and breaks deadlock/livelock conditions in a particular cache memory in the cache hierarchy, other embodiments are contemplated in which the SPROC also does so in cache memories at other levels of the cache hierarchy. Furthermore, although embodiments have been described in which the cache memory pipeline is a single pipeline, other embodiments are contemplated in which the cache memory comprises multiple pipelines. Still further, although embodiments have been described with particular data and tag array configurations, other configuration are contemplated such as the tag array split up into multiple arrays, each containing different information. Finally, although embodiments have been described in which the main processor is an x86 architecture processor, other embodiments are contemplated in which the technique is employed where the main processor has a different instruction set architecture.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
    a main processor;
    a service processor, configured to detect a deadlock/livelock condition in the main processor, the service processor having a memory configured to store a plurality of bug class patterns each having an associated action recipe;
    a cache memory; and
    a buffer;
    wherein the main processor is configured to:
        detect a patch to be applied to the service processor, wherein the patch includes:
            code executable by the service processor;
            an instruction pointer value; and
            at least one of a new bug class pattern or new associated action recipe;
        write the patch code and the at least one of the new bug class pattern or new associated action recipe to an unused location of the service processor memory;
        set an instruction breakpoint entry of the service processor, wherein the instruction breakpoint entry specifies the instruction pointer value included in the patch; and
        initiate the service processor;
    wherein, the service processor is configured to:
        when the instruction pointer of the service processor reaches the instruction pointer value specified in the instruction breakpoint entry included in the patch, jump to the location in the service processor memory to which the main processor wrote the patch code;
        control the buffer to capture information about arbitration requests that functional units of the main processor are making to the cache memory;
        analyze the information about the arbitration requests captured in the buffer to detect a pattern from among the plurality of bug class patterns and the new bug class pattern of the arbitration requests made by the functional units to the cache memory; and
        perform one or more actions specified by the action recipe or new action recipe associated with the detected pattern to break the deadlock/livelock condition in the main processor, wherein the one or more actions specified by the action recipe or new action recipe comprises at least one of:
            suppressing individual arbitration requests from attempting to arbitrate for access to the cache memory;
            suppressing individual address comparison results associated with arbitration requests; and
            marking individual requests in request queues to be killed by setting their associated kill bit.

2. The microprocessor of claim 1, further comprising:
    a retire unit, configured to retire instructions;
    wherein the service processor is configured to detect the deadlock/livelock condition in the main processor by detecting that the retire unit has not retired an instruction for at least a predetermined number of clock cycles.

3. The microprocessor of claim 2, wherein the predetermined number of clock cycles is programmable.

4. The microprocessor of claim 1, further comprising:
    a bus interface unit, configured to perform transactions on a processor bus by which the main processor communicates to an external memory;
    wherein the service processor is configured to detect the deadlock/livelock condition in the main processor by detecting that the bus interface unit indicates no transactions on the processor bus have completed for a predetermined number of clock cycles.

5. The microprocessor of claim 4, wherein the predetermined number of clock cycles is programmable.

6. The microprocessor of claim 1, further comprising:
    the service processor is further configured to disable the buffer from capturing information about arbitration requests the functional units are making to the cache memory when a predetermined event occurs.

7. The microprocessor of claim 6, further comprising:
    the predetermined event occurs when a predetermined amount of time elapses after causing the buffer to capture the information.

8. The microprocessor of claim 6, further comprising:
    the predetermined event occurs when information about a predetermined number of arbitration requests has been captured.

9. The microprocessor of claim 6, further comprising:
the predetermined event occurs when the buffer becomes full.

10. A method performed by a microprocessor having a main processor, a cache memory, a buffer and a service processor having a memory configured to store a plurality of bug class patterns each having an associated action recipe, the method comprising:
by the main processor:
executing instructions;
detecting a patch to be applied to the service processor, wherein the patch includes:
code executable by the service processor;
an instruction pointer value; and
at least one of a new bug class pattern or new associated action recipe;
writing the patch code and that at least one of the new bug class pattern or new associated action recipe to an unused location of the service processor memory;
setting an instruction breakpoint entry of the service processor, wherein the instruction breakpoint entry specifies the instruction pointer value included in the patch; and
initiating the service processor;
by the service processor:
when the instruction pointer of the service processor reaches the instruction pointer value specified in the instruction breakpoint entry included in the patch, jumping to the location in the service processor memory to which the main processor wrote the patch code;
controlling the buffer to capture information about arbitration requests that functional units of the main processor are making to the cache memory;
analyzing the information about the arbitration requests captured in the buffer to detect a pattern from among the plurality of bug class patterns and the new bug class pattern of the arbitration requests made by the functional units to the cache memory; and
performing one or more actions specified by the action recipe or new action recipe associated with the detected pattern to break a deadlock/livelock condition in the main processor, wherein the one or more actions specified by the action recipe or new action recipe comprises at least one of:
suppressing individual arbitration requests from attempting to arbitrate for access to the cache memory;
suppressing individual address comparison results associated with arbitration requests; and
marking individual requests in request queues to be killed by setting their associated kill bit.

11. The method of claim 10, further comprising:
wherein said detecting the deadlock/livelock condition in the main processor comprises the service processor detecting that a retire unit of the main processor has not retired an instruction for at least a predetermined number of clock cycles.

12. The method of claim 11, wherein the predetermined number of clock cycles is programmable.

13. The method of claim 10, further comprising:
wherein said detecting the deadlock/livelock condition in the main processor comprises the service processor detecting that a bus interface unit of the main processor indicates no transactions on a processor bus have completed for a predetermined number of clock cycles, wherein the bus interface unit is configured to perform transactions on the processor bus by which the main processor communicates to an external memory.

14. The method of claim 13, wherein the predetermined number of clock cycles is programmable.

15. The method of claim 10, further comprising:
disabling, by the service processor, the buffer from capturing information about arbitration requests the functional units are making to the cache memory when a predetermined event occurs.

16. The method of claim 15, further comprising:
the predetermined event occurs when the buffer becomes full.

17. A computer program product encoded in at least one non-transitory computer usable medium for use with a computing device, the computer program product comprising:
computer usable program code embodied in said medium, for specifying a microprocessor, the computer usable program code comprising:
first program code for specifying a main processor;
second program code for specifying a service processor, configured to detect and break a deadlock/livelock condition in the main processor, the service processor having a memory configured to store a plurality of bug class patterns each having an associated action recipe;
third program code for specifying a cache memory; and
fourth program code for specifying a buffer;
wherein the main processor is configured to:
detect a patch to be applied to the service processor, wherein the patch includes:
code executable by the service processor;
an instruction pointer value; and
at least one of a new bug class pattern or new associated action recipe;
write the patch code and the at least one of the new bug class pattern or new associated action recipe to an unused location of the service processor memory;
set an instruction breakpoint entry of the service processor, wherein the instruction breakpoint entry specifies the instruction pointer value included in the patch; and initiate the service processor;
wherein, the service processor is configured to:
when the instruction pointer of the service processor reaches the instruction pointer value specified in the instruction breakpoint entry included in the patch, jump to the location in the service processor memory to which the main processor wrote the patch code;
control the buffer to capture information about arbitration requests that functional units of the main processor are making to the cache memory;
analyze the information about the arbitration requests captured in the buffer to detect a pattern from among the plurality of bug class patterns and the new bug class pattern of the arbitration requests made by the functional units to the cache memory; and
perform one or more actions specified by the action recipe or new action recipe associated with the detected pattern to break the deadlock/livelock condition in the main processor, wherein the one or more actions specified by the action recipe or new action recipe comprises at least one of:
suppressing individual arbitration requests from attempting to arbitrate for access to the cache memory;
suppressing individual address comparison results associated with arbitration requests; and marking individual requests in request queues to be killed by setting their associated kill bit.

18. The computer program product of claim 17, wherein the at least one non-transitory computer usable medium is selected from the set of a disk, tape, or other magnetic, optical, or electronic storage medium and a network or wire line communications medium.

\* \* \* \* \*